Figure 1:
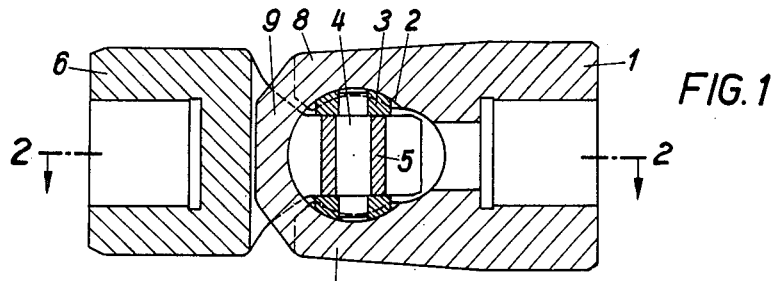

July 5, 1966　　　　W. BONHOFF　　　　3,258,936

FLEXIBLE DRIVE CONNECTION FOR SPINDLE HEADS

Filed March 12, 1964

Inventor:
Willi Bonhoff

United States Patent Office 3,258,936
Patented July 5, 1966

3,258,936
FLEXIBLE DRIVE CONNECTION FOR SPINDLE HEADS
Willi Bonhoff, Essen, Germany, assignor to Beteiligungs- und Patentverwaltungsgesellschaft mit beschränkter Haftung, Essen, Germany, a corporation of Germany
Filed Mar. 12, 1964, Ser. No. 351,358
Claims priority, application Germany, Mar. 23, 1963, B 71,271
5 Claims. (Cl. 64—7)

The present invention relates to a hinge-spindle head for the drive of drums, rollers or the like having a receiving opening for the hinge-spindle, which is limited by two flanks.

Such hinge-spindle heads are mostly forked and bored out cylindrically in the hinge points, so that the spindle is capable of assuming a predetermined angle to the roller axes by the arrangement of intermediate so-called hinge pins. The outer diameter of the hinge-spindle head is dependent upon the diameter of the drums. Since the drums are maintained at a possibly smallest diameter, the always heavier drum drives lead to always higher loads in the hinge-spindle heads. This greater load has been met so far by the use of material of greater strength and by more exact working. Nevertheless, it cannot be avoided in many instances, that the flanks of the spindle head bend out or that a break occurs. The bending out of the flanks of the spindle-head has additionally very disadvantageous effects upon the wear of the expensive hinge pins, in particular in connection with a reversible drive.

In drum units with large adjustment strokes very long hinge spindles are applied, since the inclined position angle cannot surpass a predetermined measure. For reasons of economy, these hinged spindles, particularly those of a large diameter, are made of several parts and then joined together. The finishing work of joined hinged spindles, particularly the boring out in the hinged points of the hinge spindle heads, can take place only on large bore machines and causes, therefore, high expenses. If, however, prefabricated hinge spindle heads are joined together, a deformation of the flanks can easily occur, whereby a finishing work is required and additional tensions appear.

It has also been attempted already, to bring about a connection between the roller pins and the spindle by means of a universal joint such, that the coupling sleeve is mounted with one of its ends without play on the roller pins and with its other end overlapping the hinge pins of the spindle and is connected with the latter by means of a pressure lock. An assembly and disassembly of the hinge coupling is possible, however, only if the plane faces of the roller pins and of the spindle coincide.

Finally, hinge spindle heads are also known, wherein the recesses within the range of the hinge points terminate into a slot, into which the end of the drive shaft can penetrate upon removal of the hinge spindle head. The hinge spindle heads are equipped with a shrink ring within the range of this slot. A displacement of the flanks occurs easily thereby. An upward bending of the flanks is still not completely avoided by means of such shrink ring.

It is, therefore, one object of the present invention to provide a hinge spindle head, which avoids the drawbacks of the known hinge spindle heads.

It is another object of the present invention to provide a hinge spindle head, wherein the flanks of the hinge-spindle head are connected together by means of at least one tie. A great portion of the occurring bending moment is assumed by the connection of the previously freely standing flanks, whereby the form stability of the hinge spindle head is extremely increased. This form stability effects first of all favorably the durability of the joint pins. During the joining together of prefabricated joint-spindle heads a displacement of the flanks is no more possible.

It is still another object of the present invention to provide a hinge spindle head, wherein the tie is fitted into the flanks and is connected with the latter, for instance by welding. It is thereby also possible to improve already provided hinge-spindle heads. The arrangement of a tie on already provided hinge spindle heads does not require any particular endeavor, since the counter member of the hinge spindle head, the so-called complementary member, is any way equipped in most instances with an open slot, in order to simplify the removal of the roller.

Figure 2:
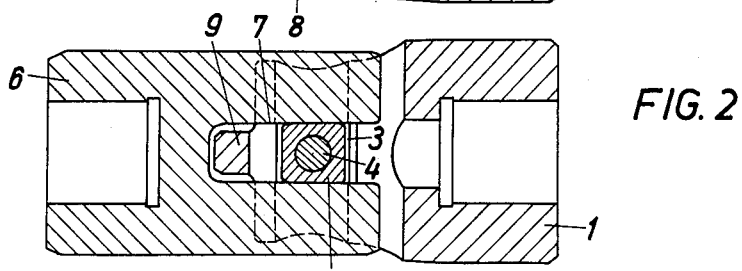
Figure 3:
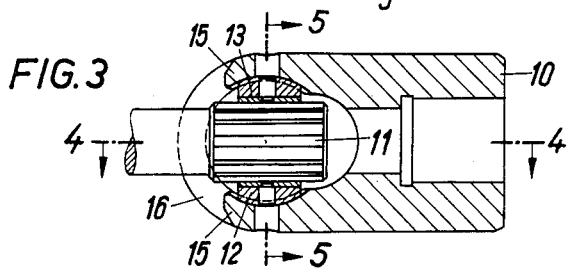
Figure 5:
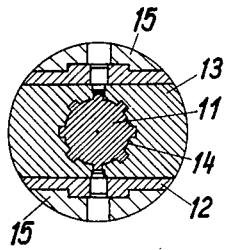
Figure 4:
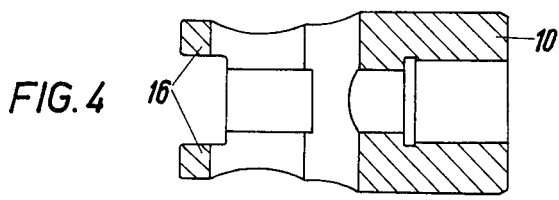
Figure 6:
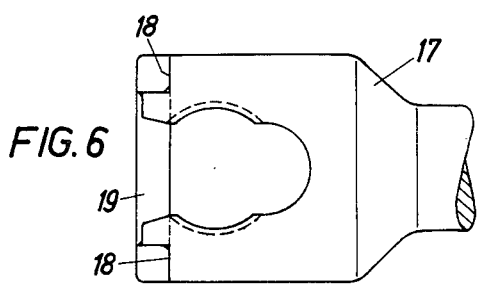

With these and other objects in view, which will become apparent in the following detailed description, the present invention will be clearly understood in connection with the accompanying drawings, in which:

FIGURE 1 is an axial section of a hinge spindle head with coordinated complementary member;
FIG. 2 is a section along the lines 2—2 of FIG. 1;
FIG. 3 is an axial section of a hinge-spindle head, which is connected with the pin of a drum, a roller or the like;
FIG. 4 is a section along the lines 4—4 of FIG. 3 with removed individual parts;
FIG. 5 is a section along the lines 5—5 of FIG. 3;
FIG. 6 is an elevation of a hinge-spindle head with welded-in tie; and
FIG. 7 is an end view of the hinge spindle head according to FIG. 6.

Referring now to the drawing, and in particular to FIGS. 1 and 2, the hinge spindle head 1 has a cylindrical recess 2 at its hinge point, in which hinge bearings 3, a bolt 4 and a sleeve 5 are disposed. A complementary member 6 grips over the sleeve 5, which member 6 is equipped with an open slot 7. The flanks 8 of the hinge spindle head 1 are connected together by means of a tie 9.

Referring now again to the drawing, and in particular to FIGS. 3 to 5, in order to make possible the connection of the hinge-spindle head 10 directly with the shaft 11 of the spindle, a fitting member 13 is disposed between the hinge bearings 12, which fitting member 13 has an inner cross-section 14 corresponding wtih the profile of the shaft 11. The flanks 15 of the hinge spindle head 10 are connected in this embodiment by means of two ties 16.

Figure 7:
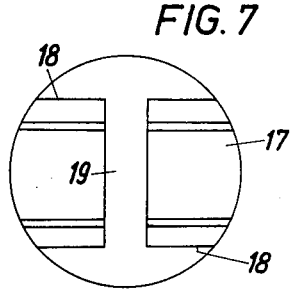

Referring now again to the drawing, and in particular to FIGS. 6 and 7, another embodiment of the subject matter of the present invention is disclosed, which is particularly suitable for the improvement of already provided hinge-spindle heads. The hinge-spindle head 17 is equipped in this embodiment with recesses 18, into which is fitted a tie 19, welded together with the hinge-spindle head 17.

While I have disclosed several embodiments of the present invention, it is to be understood that these embodiments are given by example only and not in a limiting sense, the scope of the present invention being determined by the objects and the claims.

I claim:
1. A flexible drive connection for spindle heads, comprising
  a head member including two flanks and defining a cylindrical recess,
  a complementary member extending with its one end into said cylindrical recess and defining an open slot,
  bearings disposed between the wall of the said cylindrical recess and said end of said complementary member, said two flanks and said end of said complementary member being in engagement by said bearings, and said flanks being connected together with at least one tie, and said tie being axially spaced from said cylindrical recess of said head member and received in said slot of said complementary member.

2. The flexible drive connection, as set forth in claim 1, wherein
said tie is fitted into said flanks and connected with the latter.

3. The flexible drive connection, as set forth in claim 2, wherein
said tie has a welding connection with said flanks.

4. A flexible drive connection for spindle heads, comprising
a head member including two flanks and defining a cylindrical recess,
a bolt disposed crosswise in said recess,
a sleeve surrounding said bolt,
bearings disposed between the wall of said cylindrical recess and said sleeve,
a complementary member having an open slot at one end and gripping over said sleeve,
said flanks being connected together with at least one tie, and
said tie being axially spaced from said cylindrical recess of said head member and received is said slot of said complementary member.

5. A flexible drive connection for spindle heads, comprising
a head member including two flanks and defining a cylindrical recess,
a complementary member extending with its one end into said recess to form a shaft member therein,
two bearings being in engagement with the inner walls of said flanks, respectively,
a fitting member having an inner cross-section corresponding with the profile of said shaft of said complementary member,
said bearings and said fitting member being in engagement with each other,
said flanks being connected with each other by two ties, and
said two ties propjecting axially outward from said flanks to define a slot and said shaft member received in said slot.

References Cited by the Examiner
UNITED STATES PATENTS

| | | | |
|---|---|---|---|
| 1,041,773 | 10/1912 | Geer | 64—7 |
| 1,044,734 | 11/1912 | Blood et al. | 64—7 |
| 1,300,733 | 4/1919 | Keller | 64—8 |
| 1,617,908 | 2/1927 | Hughson | 64—7 |
| 2,153,093 | 4/1939 | Magee et al. | 64—7 |

FOREIGN PATENTS 262,144   3/1931   Great Britain.

MILTON KAUFMAN, *Primary Examiner.*

HALL C. COE, *Examiner.*